2,697,086

MODIFIED MELAMINE-FORMALDEHYDE RESIN AND PROCESS OF PREPARING THE SAME

Richard Lindenfelser, Darien, and Martha K. Kilthau, Cos Cob, Conn., assignors to American Cyanamid Company, New York, N. Y., a corporation of Maine No Drawing. Application March 18, 1952, Serial No. 277,278

11 Claims. (Cl. 260—29.4)

This invention relates to a process for producing stable syrups of melamine-formaldehyde condensation products and, more particularly, this invention relates to those particular condensation products which are prepared by co-reacting melamine, formaldehyde, and certain polyvinyl butyrals, particularly those which have a hydroxyl number between about 400 and 800. Still further, this invention relates to a process for producing modified melamine resins of the class described wherein the resultant resinous product is particularly useful for the preparation of craze resistant, laminate surfaces, particularly those which are required to have improved water resistance and resistance to organic solvents and alkalis.

One of the principal objects of the present invention is to prepare a melamine-formaldehyde-polyvinyl butyral stable syrup which will be particularly suitable for use in preparing laminate surfaces. A further object of the present invention is to produce a type of resin suitable for laminate surfaces by reacting melamine, formaldehyde and certain polyvinyl butyrals under alkaline conditions in an aqueous alcohol medium until the syrup produced is stable as indicated by the failure of a sample of the reaction solution to crystallize upon cooling to 0° C. These and other objects of the present invention will be discussed more fully hereinbelow.

It is well known in the art that water soluble melamine resins are eminently suited for the treatment of paper and fabric and the bonding of these treated sheets under heat and pressure to form decorative laminates. Durable, unlimited surface design effects are possible by the treatment with melamine resin of printed sheets and the bonding of these sheets as the surface of the laminate. However, because of the brittleness of melamine resin, there is usually a limit to the amount of protective resin which may be applied. When this limit is exceeded crazing occurs on aging and a less durable product is obtained. This is especially true when solid color surfaces are obtained by the use of large amounts of decorative pigments. Many materials have been proposed to decrease the brittleness of melamine resin and to improve this craze resistance. However, most of these have not been too successful because of poor color or color stability, poor water resistance or difficult manipulation.

The use of the terms "laminate surface" "surface laminating," etc., refer to surfaces produced on laminates as an integral part of the laminating process and should be distinguished from the surface coating art wherein surface effects are produced in separate operations of spraying and baking and the like.

In the preparation of the resinous compositions of the present invention, one could use melamine and formaldehyde in a mol ratio of about 1:1.5 to about 1:4.5, melamine to formaldehyde, respectively. Preferably, one would use the mol ratio of 1:2–1:3, respectively.

The polyvinyl butyral which is used to react with the melamine and formaldehyde to produce the resinous composition of the present invention is a polyvinyl butyral having a hydroxyl number between about 400–800 and preferably a polyvinyl butyral having a hydroxyl number between about 500 and 650. If one were to attempt to use a polyvinyl butyral having a hydroxyl number appreciably below 400 such as certain of the commercially available polyvinyl butyrals having hydroxyl numbers of 161 or 256 or even higher, the compatibility of such a butyral would be so limited that the ultimate syrup produced would be practically worthless because of the incompatibility of the reactants. Furthermore, the laminate or even a surface coating film produced from such a butyral would be of no value because of the incompatibility of the resinous reactants. If one were to use a butyral having a hydroxyl number appreciably greater than 800, one would find that the solubility characteristics of such a butyral were such that although it would be compatible with the resinous syrup, the water resistance of a cured surface would be so poor that it would be useless as a surface laminating material. The amount of polyvinyl butyral as defined hereinabove, which may be used in the preparation of the resinous compositions of the present invention should be between about 20–40% by weight based on the total weight of the resin solids.

In reacting the melamine, formaldehyde, and polyvinyl butyral, one should heat the reactants under alkaline conditions such as at a pH between about 7 and 10.5 and preferably at a pH between 8 and 9. The reaction of the components should be carried out at a temperature between about 75° C. and reflux. Furthermore, the reactants should be dispersed in an alcohol aqueous medium in order that the reaction may be properly carried out. Melamine-formaldehyde resins of the class described are water soluble and have a certain tolerance for alcohols especially the lower aliphatic alcohols such as those having between 1 and 4 carbon atoms. The polyvinyl butyral of the claimed type is alcohol soluble and has a certain tolerance for water. It is not possible then to use water alone as the reaction medium nor alcohols alone as the reaction medium, as the solubility characteristics of the reacting materials makes such alternative possibilities undesirable. The reaction medium then should be an aqueous alcohol solution in which the alcohol is a lower aliphatic alcohol having 1 to 4 carbon atoms such as methanol, ethanol, propanol, isopropanol, n-butanol, isobutanol and tertiary butanol. The concentration of the alcohol in water should be between about 40% to 80% by weight based on the total weight of water and alcohol and preferably 50% to 75% by weight based on the total weight of water and alcohol. The water present in the reaction system should include the water introduced with the formaldehyde if aqueous formaldehyde solutions such as formalin are used. However, if one elects to use a compound engendering formaldehyde, such as paraformaldehyde, trioxymethylene and the like, one obviously would need to add all of the required water as part of the aqueous alcohol solution.

The concentration of reactants in the aqueous alcohol solution should be between about 25–50% by weight based on the total weight of the reactants and the aqueous alcohol solution and preferably between about 35–45%.

We have discovered a method for producing melamine resin syrups modified by coreaction with certain polyvinyl butyrals of comparatively high hydroxyl content. These resin syrups can be prepared in a one step process which are entirely compatible, i. e., the resin syrup does not tend to separate out into two or more phases; and are stable for prolonged periods of time, e. g., periods greater than one year. Still further, the syrups produced according to the process of the present invention impart improved craze resistance, water resistance and other desirable properties to laminates, pigmented surface coatings on laminates and similar applications.

The toughness and water resistance of polyvinyl butyrals in general when considered in comparison with polyvinyl alcohol are well known. However, many polyvinyl butyrals are not compatible with the melamine resin syrup because of a low hydroxyl content of the butyral. As a consequence, a satisfactory solution cannot be obtained if the hydroxyl number is appreciably below 400, such as a polyvinyl butyral with a hydroxyl number of 256. On the other hand, when one uses a polyvinyl butyral with too high a hydroxyl number, i. e., approaching that of polyvinyl alcohol, there is to be noted a considerable decrease in water resistance. We have discovered that by using a polyvinyl butyral having a hydroxyl number within the range of about 400–800 and preferably 500–650, we are able to obtain compatibility between the butyral and the melamine resin and at the same time retain the toughness and the water resistance for which butyrals with lower hydroxyl numbers are noted. In order that the present invention may be more completely understood, the following examples are set forth in which all parts are parts by weight. These examples are set forth solely for the purpose of illustration and any specific enumeration of detail contained therein should not be interpreted as a limitation on the case except as indicated in the appended claims.

*Example 1*

126 parts of melamine (1 mol), 243 parts of a 37% aqueous solution of formaldehyde (3 mols), 92.5 parts of polyvinyl butyral (30% of the calculated resin solids) having a hydroxyl number of about 528 and 225 parts of ethyl alcohol are introduced into a suitable reaction chamber equipped with thermometer, stirrer and reflux condenser to give a 45% solids (reactable materials) solution. The slurry pH is made alkaline to phenol red with sodium hydroxide solution and the mixture is heated to reflux in 30 minutes. The heating is continued at reflux for an additional two hours at 45% solids and the resin is then diluted to 40% solids by adding 85 parts ethanol and refluxing is continued further for an additional 1¼ hours. The resulting syrup is completely compatible or homogeneous and is stable for a six month period at room temperature.

*Example 2*

A pigmented resin for use in surface coatings is prepared by stirring together 54 parts of the polyvinyl butyral modified resin syrup (35% solids) prepared according to Example 1 and 46 parts of a pigment Titanox LO-168. The mixture of resin and pigment is then ball milled for about 16 hours and coated sheets are prepared by spreading 0.45 grams of the syrup per square inch on sheets impregnated with a melamine-formaldehyde resin dissolved in a solvent comprising methyl cellosolve and water. The coated sheets are then oven dried for one hour at 105° C. and pressed 5 minutes at 150° C., and 1000 p. s. i. as a cover sheet assembled with a core of 5 Kraft phenolic sheets. The panels thus produced are capable of resisting 5 to 8 cycles in a steam and dry test (each cycle consisting of ½ hour's exposure to steam followed by ½ hour's drying at 105° C.). After the test cycles, the panels still show good water resistant. Other panels produced by using pigmented surface coating melamine-formaldehyde resins modified with (1) polyvinyl alcohol, (2) benzyl alcohol, (3) glycerol show much poorer water resistance.

The use of any desirable pigment may be effected and the amount of pigment is not critical insofar as one could avoid completely the use of pigment in order to make a clear, panel on a wood layer where it would be desired to have the grain of wood show through the laminated surface. When it is desired to have a white pigmented surface, however, one may use as little as 30% of the pigment based on the weight of the modified resin syrup but preferably amounts of about 45-50% pigment because of the better appearance produced in the pressed surface. For dark colors such as black one may use pigment in amounts as small as 5% to 10% by weight based on the total weight of pigment solids and resin solids.

The polyvinyl butyral modified melamine resins of the present invention have additional uses besides that of decorative laminating. For instance, they may be used to advantage as impregnating resins for producing paper, cloth or glass laminates with improved craze resistance.

*Example 3*

Glass cloth, impregnated with a 45% solids solution of the polyvinyl butyral modified melamine resin prepared according to Example 1 is dried to a 35–40% resin solids content by weight based on the total weight of resin and cloth. 18-ply-cross grain laminates are prepared by pressing for 15 minutes at 140° C. and 1100 p. s. i. The insulation resistance of these laminates is comparable to unmodified melamine resins while the craze resistance is markedly improved over the unmodified melamine resin.

We claim:

1. A process for producing a resinous composition, suitable for use in preparing laminate surfaces, comprising heating melamine, formaldehyde and a polyvinyl butyral at a pH between about 7–10.5 and at a temperature between about 75° C. and reflux in an alcohol aqueous medium until the reaction solution no longer crystallizes upon cooling to 0° C., wherein the mol ratio of the melamine to formaldehyde is between 1:1.5 and 1:4.5, respectively, wherein said polyvinyl butyral has a hyrdoxyl number between about 400 and 800 and said polyvinyl butyral is present in the composition in an amount varying between about 20%–40% by weight based on the total weight of resin solids wherein said alcohol is a lower saturated monohydric aliphatic alcohol having 1–4 carbon atoms and said aqueous alcohol solution has a concentration of alcohol between about 40–80% by weight based on the total weight of alcohol aqueous solution.

2. A process for producing a resinous composition, suitable for use in preparing laminate surfaces, comprising heating melamine, formaldehyde and a polyvinyl butyral at a pH between about 7–10.5 and at a temperature between about 75° C. and reflux in an alcohol aqueous medium until the reaction solution no longer crystallizes upon cooling to 0° C., wherein the mol ratio of the melamine to formaldehyde is between 1:2 and 1:3, respectively, wherein said polyvinyl butyral has a hydroxyl number between about 400 and 800 and said polyvinyl butyral is present in the composition in an amount varying between about 20–40% by weight based on the total weight of resin solids wherein said alcohol is a lower saturated monohydric aliphatic alcohol having 1–4 carbon atoms and said aqueous alcohol solution has a concentration of alcohol between about 40–80% by weight based on the total weight of alcohol aqueous solution.

3. A process for producing a resinous composition, suitable for use in preparing laminate surfaces, comprising heating melamine, formaldehyde and a polyvinyl butyral at a pH between about 8–9 and at a temperature between about 75° C. and reflux in an alcohol aqueous medium until the reaction solution no longer crystallizes upon cooling to 0° C., wherein the mol ratio of the melamine to formaldehyde is between 1:1.5 and 1:4.5, respectively, wherein said polyvinyl butyral has a hydroxyl number between about 400–800 and said polyvinyl butyral is present in the composition in an amount varying between about 20–40% by weight based on the total weight of resin solids wherein said alcohol is a lower saturated monohydric aliphatic alcohol having 1–4 carbon atoms and said aqueous alcohol solution has a concentration of alcohol between about 40–80% by weight based on the total weight of alcohol aqueous solution.

4. A process for producing a resinous composition, suitable for use in preparing laminate surfaces, comprising heating melamine, formaldehyde and a polyvinyl butyral at a pH between about 8–9 and at a temperature between about 75° C. and reflux in an alcohol aqueous medium until the reaction solution no longer crystallizes upon cooling to 0° C., wherein the mol ratio of the melamine to formaldehyde is between 1:2 and 1:3, respectively, wherein said polyvinyl butyral has a hydroxyl number between about 400–800 and said polyvinyl butyral is present in the composition in an amount varying between about 20–40% by weight based on the total weight of the resin solids wherein said alcohol is a lower saturated monohydric aliphatic alcohol having 1–4 carbon atoms and said aqueous alcohol solution has a concentration of alcohol between about 40–80% by weight based on the total weight of alcohol aqueous solution.

5. A process for producing a resinous composition, suitable for use in preparing laminate surfaces, comprising heating melamine, formaldehyde and a polyvinyl butyral at a pH between about 7–10.5 and at a temperature between about 75° C. and reflux in an alcohol aqueous medium until the reaction solution no longer crystallizes upon cooling to 0° C., wherein the mol ratio of the melamine to formaldehyde is between 1:1.5 and 1:4.5, respectively, wherein said polyvinyl butyral has a hydroxyl number between about 500–650, said polyvinyl butyral is present in the composition in an amount varying between about 20–40% by weight based on the total weight of resin solids wherein said alcohol is a lower saturated monohydric aliphatic alcohol having 1–4 carbon atoms and said aqueous alcohol solution has a concentration of alcohol between about 40–80% by weight based on the total weight of alcohol aqueous solution.

6. A process for producing a resinous composition, suitable for use in preparing laminate surfaces, comprising heating melamine, formaldehyde and a polyvinyl butyral at a pH between about 7–10.5 and at a temperature between about 75° C. and reflux in an alcohol aqueous medium until the reaction solution no longer crystallizes upon cooling to 0° C., wherein the mol ratio of the melamine to formaldehyde is between 1:2 and 1:3, respectively, wherein said polyvinyl butyral has a hydrolysis number between about 500–650 and said polyvinyl butyral is present in the composition in an amount varying between about 20–40% by weight based on the total weight of resin solids wherein said alcohol is a lower saturated monohydric aliphatic alcohol having 1–4 carbon atoms and said aqueous alcohol solution has a concentration of alcohol between about 40–80% by weight based on the total weight of alcohol aqueous solution.

7. A process for producing a resinous composition, suitable for use in preparing laminate surfaces, comprising heating melamine, formaldehyde and a polyvinyl butyral at a pH between about 8–9 and at a temperature between about 75° C. and reflux in an alcohol aqueous medium until the reaction solution no longer crystallizes upon cooling to 0° C., wherein the mol ratio of the melamine to formaldehyde is between 1:1.5 and 1:4.5, respectively, wherein said polyvinyl butyral has a hydroxyl number between about 500–650 and said polyvinyl butyral is present in the composition in an amount varying between about 20–40% by weight based on the total weight of resin solids wherein said alcohol is a lower saturated monohydric aliphatic alcohol having 1–4 carbon atoms and said aqueous alcohol solution has a concentration of alcohol between about 40–80% by weight based on the total weight of alcohol aqueous solution.

8. A process for producing a resinous composition, suitable for use in preparing laminate surfaces, comprising heating melamine, formaldehyde and a polyvinyl butyral at a pH between about 8–9 and at a temperature between about 75° C. and reflux in an alcohol aqueous medium until the reaction solution no longer crystallizes upon cooling to 0° C., wherein the mol ratio of the melamine to formaldehyde is between 1:2 and 1:3, respectively, wherein said polyvinyl butyral has a hydroxyl number between 500–650 and said polyvinyl butyral is present in the composition in an amount varying between about 20–40% by weight based on the total weight of resin solids wherein said alcohol is a lower saturated monohydric aliphatic alcohol having 1–4 carbon atoms and said aqueous alcohol solution has a concentration of alcohol between about 40–80% by weight based on the total weight of alcohol aqueous solution.

9. The product produced according to the process of claim 1.

10. The product produced according to the process of claim 4.

11. The product produced according to the process of claim 8.

References Cited in the file of this patent

UNITED STATES PATENTS

| Number | Name | Date |
|---|---|---|
| 2,448,638 | Murray et al. | Sept. 7, 1948 |
| 2,537,017 | Barrett | Jan. 9, 1951 |
| 2,537,111 | Wood | Jan. 9, 1951 |